United States Patent
Gathoo et al.

(10) Patent No.: US 7,165,229 B1
(45) Date of Patent: Jan. 16, 2007

(54) GENERATING OPTIMIZED AND SECURE IP CORES

(75) Inventors: Yogesh Gathoo, Santa Clara, CA (US); Bradley Grove, San Francisco, CA (US)

(73) Assignee: Altera Corporation, San Jose, CA (US)

( * ) Notice: Subject to any disclaimer, the term of this patent is extended or adjusted under 35 U.S.C. 154(b) by 264 days.

(21) Appl. No.: 10/852,832

(22) Filed: May 24, 2004

(51) Int. Cl.
 *G06F 17/50* (2006.01)
(52) U.S. Cl. ............................... 716/1; 716/16; 716/17
(58) Field of Classification Search ................... 716/1, 716/16, 17
See application file for complete search history.

(56) References Cited

U.S. PATENT DOCUMENTS 5,841,663 A * 11/1998 Sharma et al. ................. 716/18
6,976,239 B1 * 12/2005 Allen et al. ................... 716/16
2003/0093655 A1 * 5/2003 Gosior et al. ................ 712/228

OTHER PUBLICATIONS

XILINX, *IP Cores, Reference Designs and Design Services*, Products & Services, http://www.xilinx.com/ipcenter/index.htm, Jul. 18, 2005.
XILINX, *10 Gigabit Ethernet Media Access Controller (10GEMAC) Xilinx IP Core*, http://www.xilinx.com/xlnx, Jul. 18, 2005.
XILINX, *10 GEMAC Purchase and Registration Instructions*, http://www.xilinx.com/ipcenter/10ge/10ge_ registration.htm, Jul. 18, 2005.

* cited by examiner

*Primary Examiner*—Sun James Lin
(74) *Attorney, Agent, or Firm*—Beyer Weaver & Thomas, LLP (57) ABSTRACT

Methods and apparatus are provided for securely generating IP cores. A designer selects and configures parameterizable IP cores provided for implementation on a programmable chip. The IP cores are processed using mechanisms such as scripts to parameterize and customize the IP cores while removing option and parameter information. IP core, related scripts, and results are provided in encrypted form.

27 Claims, 8 Drawing Sheets

IP Core 301

Configuration 333
8-bit, parity, 4800 baud

GENERATING OPTIMIZED AND SECURE IP CORES

BACKGROUND OF THE INVENTION

1. Field of the Invention

The present invention relates to intellectual property (IP) cores. In one example, the present invention relates to methods and apparatus for generating optimized IP cores in a secure manner.

2. Description of Related Art

Programmable chips can be implemented in a variety of ways. In some examples, designers can provide complete hardware descriptor language files to allow configuration of logic and circuitry on a programmable device. In some instances, designers can write these hardware descriptor language files from scratch. However in many instances, designers are aided by the use of IP cores available from logic libraries provided with a programmable chip. The IP cores are generally tested and debugged blocks of logic that can be used for specific purposes to simplify implementation on a programmable chip.

In some instances, the IP cores are static and a user simply selects the static core, such as a counter, from a library for use in a hardware design. Although the counter may not be customizable for a particular user's needs, several counters may be available in a library and a designer can select the appropriate counter for a particular design. Some IP core libraries include parameterizable IP cores. The parameterizable IP cores can be more specifically configured based on particular user needs. For example, a user may select a 4-bit counter or an 8-bit counter. Alternatively a user may select whether a counter rolls over.

Furthermore, IP cores can be provided in presynthesized form to allow even greater ease-of-use for a particular designer. However, each of these techniques for providing logic has associated drawbacks. Consequently, it is desirable to provide improved mechanisms for providing and generating IP cores for implementation on a programmable chip.

SUMMARY OF THE INVENTION

Methods and apparatus are provided for securely generating IP cores. A designer selects and configures parameterizable IP cores provided for implementation on a programmable chip. The IP cores are processed using mechanisms such as scripts to parameterize and customize the IP cores while removing option and parameter information. IP core, related scripts, and results are provided in encrypted form.

In one embodiment, a for generating an IP core is provided. Parameter information associated with a parameterizable core is received. The parameterizable core includes option information corresponding to the received parameter information. The parameterizable core and scripts associated with the parameterizable core are decrypted. The parameterizable core is processed using the scripts to generate a static core. The scripts remove option information included in the parameterizable core. The static core is specially configured based on received parameter information.

In another embodiment, a computer system is provided. The computer system includes memory, an interface, and a processor. The interface is operable to receive parameter information associated with a parameterizable core. The parameterizable core includes option information corresponding to the received parameter information. The processor is coupled to memory. The processor is operable to decrypt the parameterizable core and decrypt scripts associated with the parameterizable core and evaluate the parameterizable core using the scripts. The scripts removing option information included in the parameterizable core. The static core is specially configured based on received parameter information.

In another embodiment, a programmable chip is provided. The programmable chip includes a plurality of components. At least one of the plurality of components implemented on the programmable chip is a static core converted from a parameterizable core. The parameterizable core is evaluated using scripts to remove option information associated with the parameterizable core to create a static core. The static core is specially configured based on user provided parameter information.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of particular processors and memory.

However, it should be noted that the techniques of the present invention can be applied to a variety of types of devices. In the following description, numerous specific details are set forth in order to provide a thorough understanding of the present invention. The present invention may be practiced without some or all of these specific details. In other instances, well known process operations have not been described in detail in order not to unnecessarily obscure the present invention. Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

Many designs for programmable chips are implemented using a variety of different intellectual property cores. Using intellectual property or IP cores allows a designer to quickly implement custom configuration of a programmable chip without having to code and design everything from ground up. For example, timer and interface components on a programmable chip can be configured using available timer and interface IP cores provided as a part of a library of components. Such IP Cores are known as Hard-IP, where a programmable chip has equivalent hardware component. On the contrary a Soft-IP utilizes Logic cells and inter-connects fabric of programmable chip to perform designer intended operations. For e.g. a IP Core for PCI can make programmable chip act as Master/Slave component of the PCI Bus.

Any intellectual property function, megafunction, library block, or intellectual property core that is reusable in the implementation of a programmable chip is referred to herein as an IP core. In many cases, companies supplying IP cores will encrypt the IP cores to protect the intellectual property. The IP cores can then be provided as encrypted IP cores. In some instances, the IP cores are static. Static cores are relatively efficient as they are provided specific purposes. They are configured for general use but remain relatively inflexible. To allow further customization, some IP cores are provided as parameterizable IP cores. Parameterizable IP cores include design parameters that can be customized based on particular user needs. For example, a user may select either a 4-bit timer or an 8-bit timer. The user may also select the baud rate associated with a particular universal asynchronous receiver transmitter (UART). In order to provide parameterizable components, many IP cores include option information in associated hardware description language (VHDL, Verlog HDL) that can significantly increase the complexity associated with building and debugging the IP cores.

IP cores are typically written in hardware descriptor language such Verilog or VHDL. However, hardware descriptor language as such as Verilog or VHDL are not ideal for expressing option information used to allow for parameterization. Verilog provides defparams and VHDL provides generics that have to be used judiciously in order to maintain design efficiency and effectiveness. Having numerous possible combinations of generics and defparams in design files causes the designing and debugging of IP cores to be complex and time-consuming. Moreover, these languages typically lack expression evaluation capabilities that are richly available in software languages such as C++/JAVA. Having extra code to handle generics and defparams also affects time taken for compilation and synthesis of IP cores.

Consequently, in some instances, companies provide encrypted presynthesized IP blocks for common requested configurations. For example, if a 9600 baud UART with parity configured is a particularly common configuration, a presynthesized IP block can be provided to reduce the occurrence of generics and defparams that would have been used if a parameterizable core were implemented. Any entity providing IP cores is referred to herein as a provider. Any entity using the IP cores for implementing programmable chips is referred to herein as a customer or a designer. A customer can use the presynthesized IP block to implement a design on a programmable chip without having to go through the steps of input, compilation, and synthesis for the particular component.

A provider generating presynthesized IP blocks uses valuable time and skilled resources in developing the presynthesized block. The presynthesized block may not be available to a customer for a matter of weeks. Although it may be particularly convenient for a customer, it may not be particularly convenient for a provider. Furthermore, preconfigured and presynthesized IP blocks are large, difficult to share, download, install, and/or deliver. In addition, some customers do not wait to reveal particular configurations for their components.

In some instances, designers can provide parameter information to a provider through a mechanism such as a website in order to receive a presynthesized IP block. However, some designers may not like to reveal the size and type of components used on a particular chip. In some instances, designers would prefer to have a controlled environment where they can customize programmable chips for their particular purposes without having to reveal parameter and configuration information.

Consequently, the techniques of the present invention provide mechanisms for a provider to efficiently and effectively develop IP cores. The IP cores can be customized and optimized using high-level software languages to aid in programming and testing of parameterizable IP cores. A large number of options are no longer needed within the hardware descriptor language files. Rich expression evaluation features of software languages can be utilized. IP designs are protected effectively through encryption and secured processes. Customers can use the IP cores to generate IP design files that are specifically customized and optimized without having generics and defparams included as overhead. IP designs maintain the flexibility of parameterizable designs while also having the efficiency of static cores.

Figure 1:
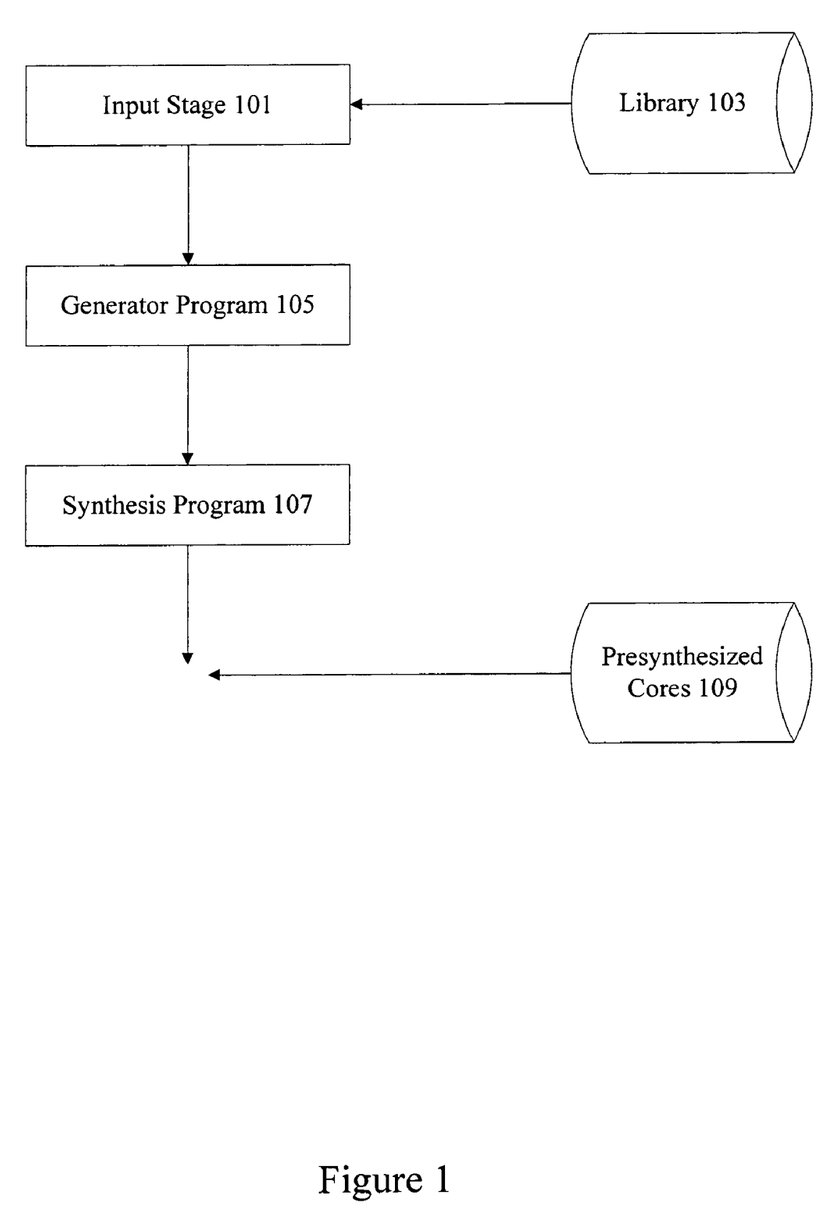
FIG. 1 is a diagrammatic representation showing input of IP Cores for implementing a programmable device.

FIG. 1 is a diagrammatic representation showing implementation of a system on a programmable chip. An input stage 101 uses IP cores available from a library 103 or other data source. In one example, an input stage 101 may select components such as a parallel input output (PIO) and an Ethernet component and provide the components for implementation. Some components are parameterizable while other components are static. According to various embodiments, information in library 103 is encrypted. In one example, 3DES encryption is used, although other types of encryption such as RC4 can be used as well. Static cores provided are generally not customizable at all. On the other hand, cores that can be customized include numerous design parameters for controlling the configuration of the particular cores. According to various embodiments, an input stage receives user selection information for logic such as a PIO and an Ethernet component to be implemented on an electronic device.

In one example, an input stage 101 often allows selection and parameterization of components to be used on an electronic device. For example, the input stage 101 allows configuration of variable or fixed latency support. The input stage 101 may be a graphical user interface using wizards including forms, buttons, and pull-down menus for allowing efficient or convenient entry of information. The input stage may also be a text interface or a program reading a data file such as a spreadsheet, database table, or schematic to acquire selection information. The input stage 101 produces output data having information about the various modules selected and parameterized. According to various embodiments, a wrapper file is generated for each parameterized core. The wrapper file instantiates the IP core and initializes the generics and defparams. The parameterized core still includes design and parameter options that are selected by data passed by a particular wrapper file.

A generator program 105 creates a logic description and provides the logic description along with other customized logic to any of a variety of synthesis tools, place and route programs, and logic configuration tools to allow a logic description to be implemented on an electronic device.

In one example, the generator program 105 provides information to a synthesis tool 107 to allow HDL files to be automatically synthesized. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif.

According to other embodiments, a logic description is a synthesized netlist such as an Electronic Design Interchange Format Input File (EDF file). An EDF file is one example of a synthesized netlist file that can be output by the synthesis tool 107. A synthesis tool 107 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

In many instances, IP cores can also be provided as presynthesized cores 109. A provider can generate presynthesized variants for common configurations or for customer requests. These variants are also typically encrypted. Providing presynthesized variants simplifies implementation of a programmable chip by a user. However, costs are shifted to the provider that generates the presynthesized blocks. A large number of resources are typically devoted to generate the presynthesized cores upon customer requests. Generation also generally takes a notable period of time. Presynthesized cores are generally large files that are difficult to deliver to a customer.

Figure 2:
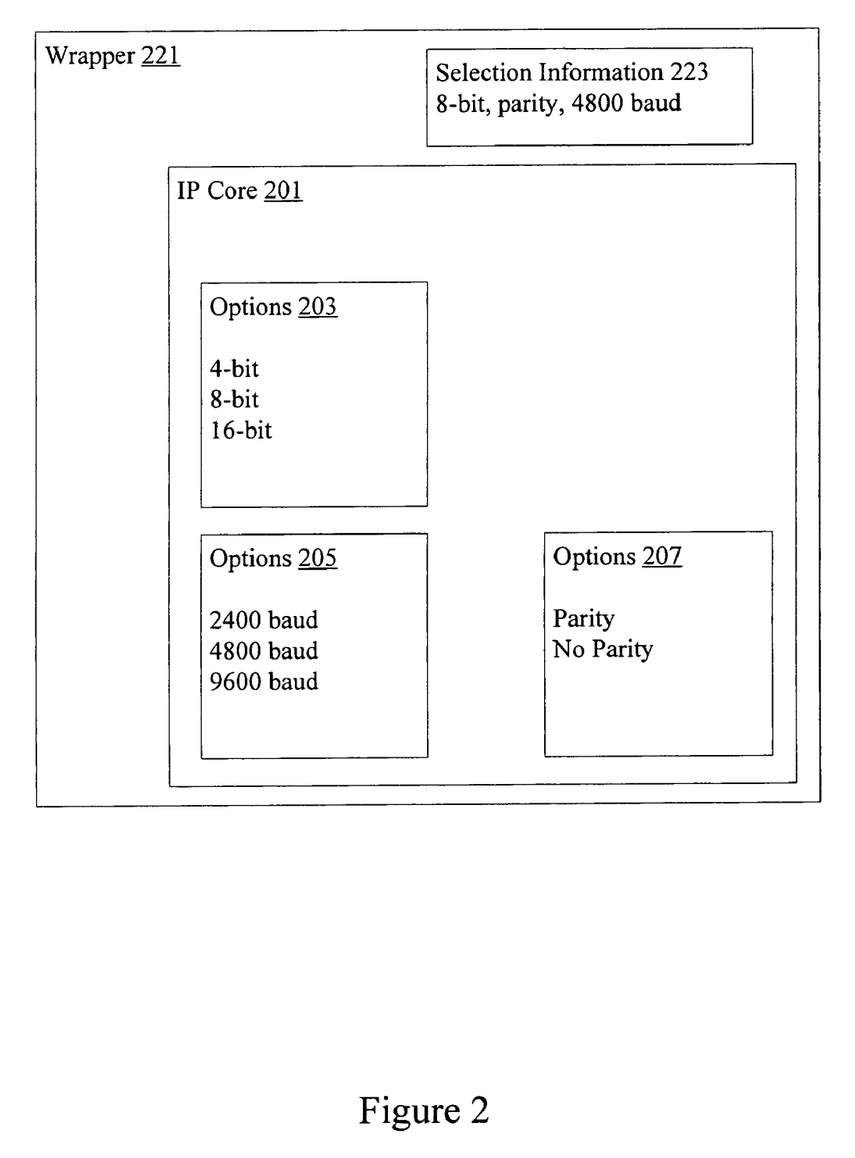
FIG. 2 is a diagrammatic representation showing a parameterizable core and a wrapper.

FIG. 2 is a diagrammatic representation showing an IP core including option and parameter information. An IP core 201 includes option and parameter information 203, 205, and 207. Option information 203 allows the IP core 201 to be configured as a 4-bit, 8-bit, or 16-bit component. Option information 205 allows the component to be configured as a 2400 baud, 4800 baud, or 9600 baud component. Option information 207 allows a user to configure parity or no parity settings. The IP core 201 is typically prepared using a hardware descriptor language with the various option and selection parameters included. A wrapper 221 can then be generated to identify selection information and parameter information used with the particular IP core 201 when the IP core 201 is instantiated. In one example, the wrapper 221 selects a 8-bit, 4800 baud component with parity.

The wrapper 221 along with the IP core 201 are passed to various modules such as synthesis and simulation modules. Option information is maintained within the IP core 201. Because option information is maintained, the IP core 201 is not optimally efficient. Hardware descriptor languages are not well-suited for providing options and parameters and evaluating complex interdependencies among such options and parameters. In general, hardware description languages lack expression evaluation capabilities and handling data types. Consequently, inefficiency remains in order to allow the IP core to be parameterizable.

The techniques of the present invention recognize that a variety of other languages are more suitable for handling, expressing and evaluating option and parameter information. Languages such as Perl can effectively and efficiently handle parameter information while also performing text based processing. Any mechanism or algorithm used to perform text based processing on a design file is referred to herein as a processing script or a script.

Figure 3:
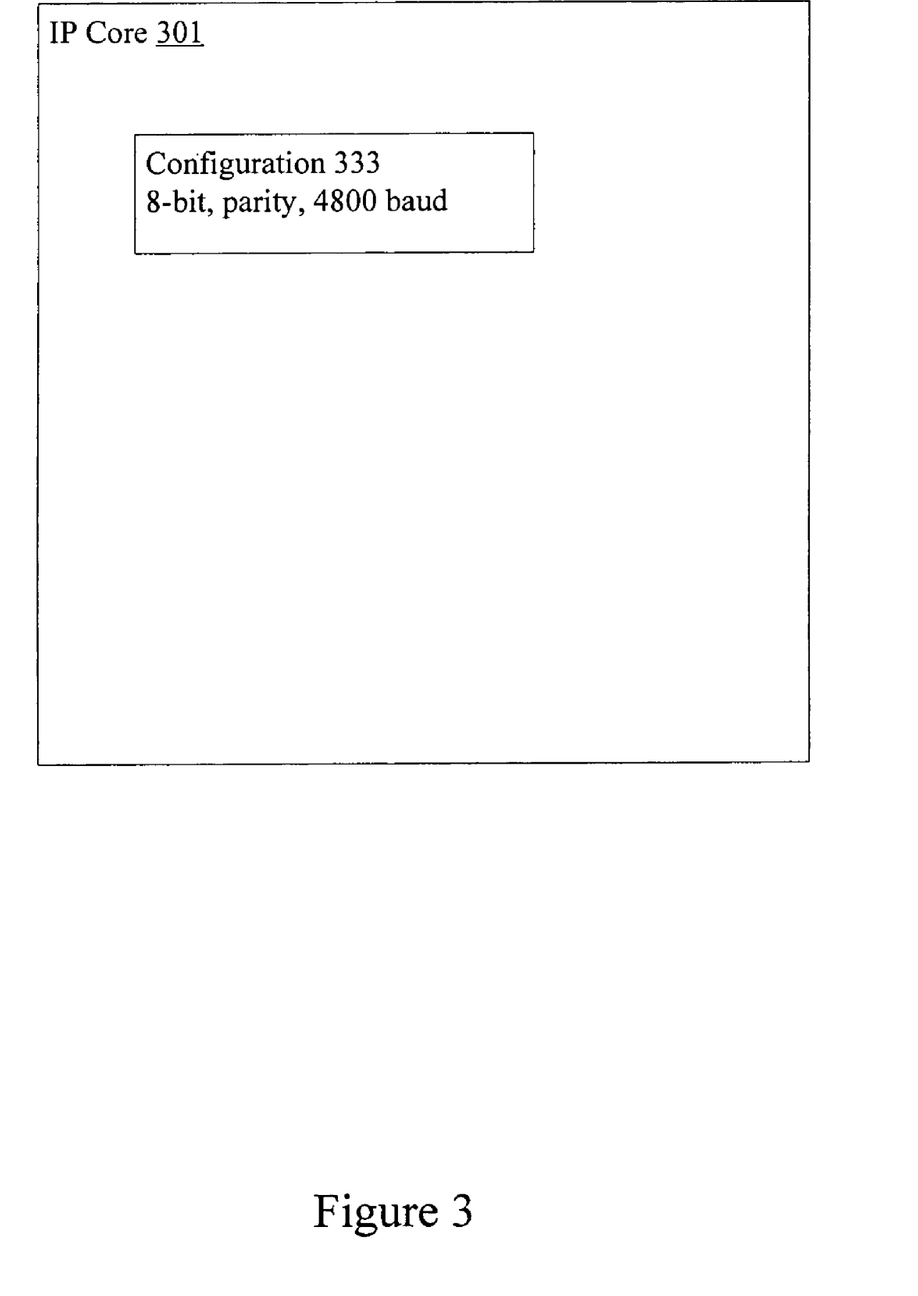
FIG. 3 is a diagrammatic representation showing a core and associated scripts used to generate a static core.

FIG. 3 is a diagrammatic representation showing one example of script usage. According to various embodiments, an IP core 301 includes option and parameter information such as generics and defparams. The option and parameter information is typically handled by providing a wrapper file around an HDL file having the option and parameter information. However, the techniques of the present invention recognize that each IP core can be provided with one or more scripts. In one example, user parameters such as baud rate and error correction availability are used by scripts to process an IP core 301. The scripts are evaluated to alter the IP core 301. In one example, scripts convert a parameterizable IP core 301 into an IP core 301 that no longer has generics and defparams included. In one example, the IP core 301 includes customized information 333. Any information included in an IP core used to allow for parameterization is referred to herein as option or configuration information. According to various embodiments, script processing removes option information. According to some embodiments, the IP core 301 resembles a static core that is no longer parameterizable.

Figure 4:
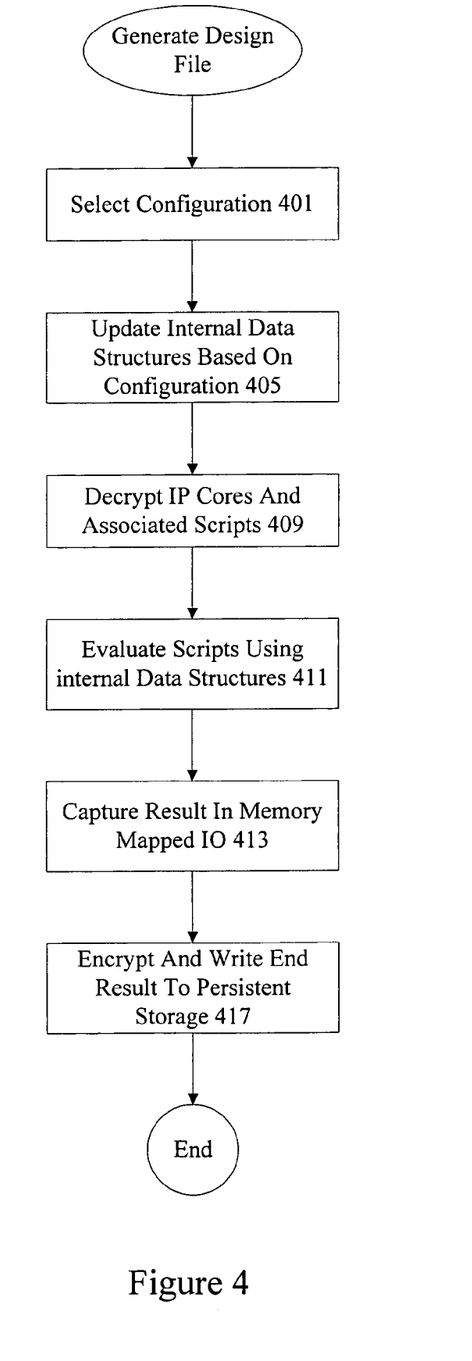
FIG. 4 is a flow process diagram showing a technique for generating an optimized and customized core.

FIG. 4 is a flow process diagram showing a technique for generating a design file using script processing. At 401, a configuration is selected. The configuration can be selected using a variety of mechanisms such as graphical user interfaces, data files, text interfaces, etc. At 405, internal data structures are updated based on the configuration. Internal data structures can store option and parameter information associated with selected components. At 409, IP cores and associated scripts are decrypted. In some examples, IP cores and associated scripts encrypted using 3DES are obtained from a library using the configuration information provided by a user. The IP cores and associated scripts are typically proprietary and protected using a variety of encryption mechanisms such as 3DES or RC4. Mechanisms for authentication can also be provided to allow a user to determine if the IP core and associated scripts are being provided by a valid entity.

At 411, the scripts are evaluated based on the updated internal data structures. At 413, the result is captured in memory mapped I/O. According to various embodiments, the result is also encrypted or scrambled into a temporary storage location. IP cores are generally proprietary and it can be difficult to maintain encryption throughout the development process. However, the techniques of the present invention allow encryption throughout the entire process so that IP cores are not written in decrypted form to persistent memory. At 417, an encrypted end result is written to persistent storage. The encrypted end result can be used for synthesis or simulation.

According to various embodiments, the encryption used to protect the IP cores and the encryption used to protect script processed IP cores can involve different keys. In one example, the script processed IP core can be encrypted using a key available to a synthesis and/or simulation tool or to a development platform including a synthesis and a simulation tool. The IP core and associated script from a library can be encrypted using a different key.

Although the techniques and mechanisms of the present invention are applicable to a variety of different processing systems, the techniques and mechanisms of the present invention are particularly applicable to programmable chips and programmable chip systems.

Figure 5:
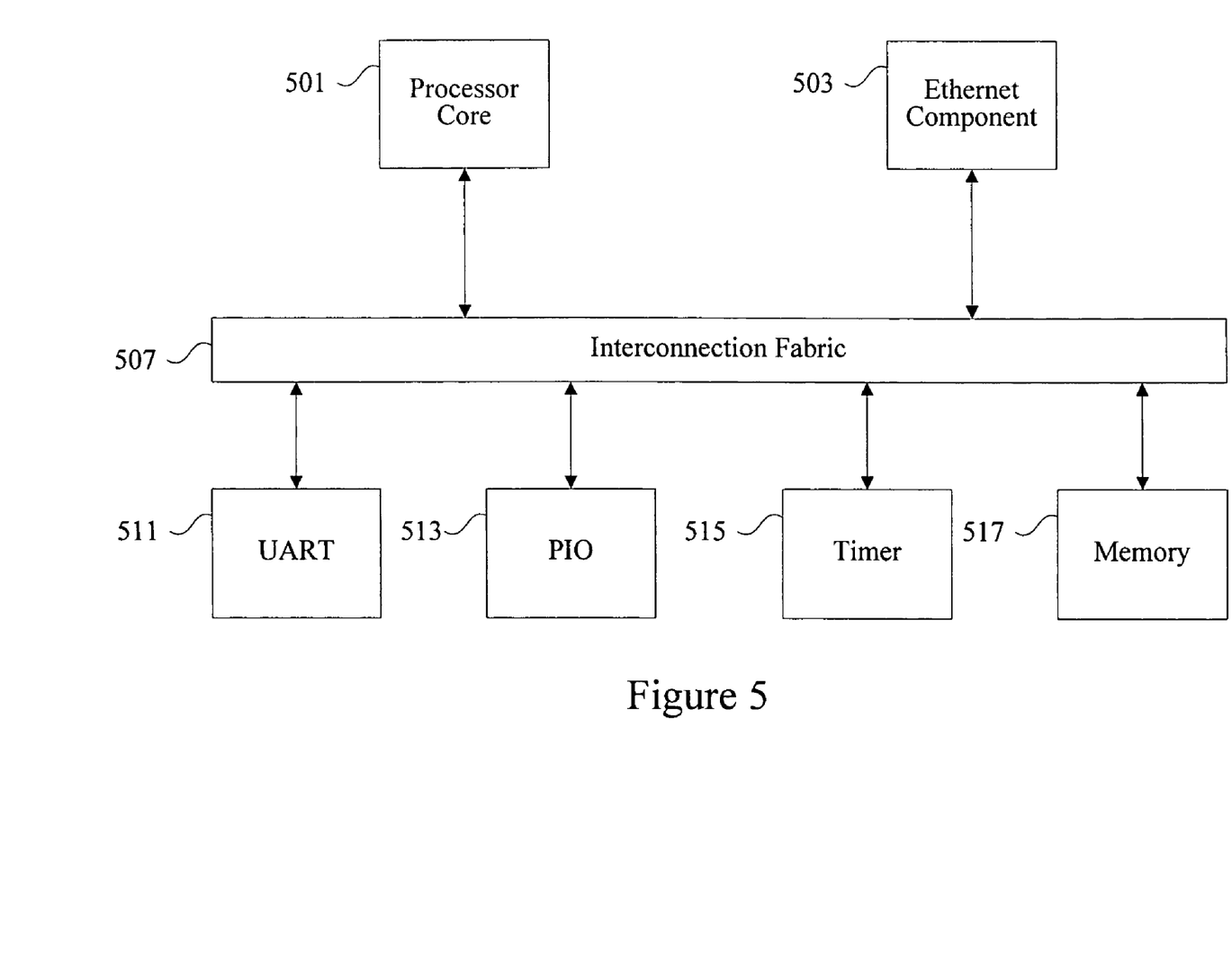
FIG. 5 is a diagrammatic representation of a programmable chip.

FIG. 5 is a diagrammatic representation showing one example of a system on a programmable chip that can used the techniques of the present invention. In one example, the programmable chip can be implemented as a device without a processor core. In other examples, the system includes a processor core, a hardware accelerator, peripheral devices, and peripheral interfaces. The components can be obtained a parameterizable cores from a library or database. The system on a programmable chip includes processor core 501 and an Ethernet component 503 as well as peripheral components UART 511, PIO 513, timer 515, and data memory 517. In some examples, the Ethernet component 503 is instead a Digital Signal Processing (DSP) core, a cryptography accelerator, or a video processor.

It should be noted that the system can include both on-chip memory 517 and off-chip memory. In one example, the data memory 517 can support variable latency or fixed latency access. The components are interconnected using an interconnection fabric 507. Any mechanism or logic for connecting components in a system is referred to herein as an interconnection fabric. In one example, the interconnection fabric is a bus. In another example, the interconnection fabric is a secondary side arbitration fabric.

The programmable chip uses different types of resources that can be interchangeably used in different allocations to implement the system on a programmable chip. In one example, the programmable chip uses logic elements for implementing each of the various components on the programmable chip.

Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of look up tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register.

A system bus typically has a set width (e.g. 64 bits, 128 bits) and allows only one primary component to actively use the bus at any one time. In conventional systems, only one primary component can access any one of the given secondary components at any given time. Multiple primary components accessing secondary components in a manner that would cause data bit collisions if performed on the same data lines is referred to herein as accessing secondary components at the same time.

In one example, an Ethernet component is accessing a secondary PIO. While the Ethernet component is accessing the secondary PIO, a processor can not access an SDRAM through a peripheral interface even if both the primary streaming output device and the peripheral interface are available.

According to various embodiments of the present invention, it is recognized that a bus is no longer required in certain applications such as system on a chip, system on a programmable chip, and other computer system implementations. A device such as a programmable logic device (PLD) or a field programmable gate array (FPGA) using a hardware descriptor language (HDL) is herein referred to as a programmable chip or a programmable device. Instead of implementing complicated bus sharing schemes using mechanisms such as splitting, the bus itself can be eliminated to improve system performance.

The conventional data and address lines that make up the bus are no longer the resource in contention. Instead, secondary components are resources in contention, as the number of physical lines connected to each secondary component in a system can be fixed. Furthermore, by not using a bus, interconnection flexibility is enhanced. For example, an Ethernet component can be allocated a variety of ports for directly accessing a memory and the only resource in contention would be the memory.

Consequently, a system bus arbitrator associated with all the secondary components in a computer system is no longer needed. Instead, secondary components themselves that may be accessed by more than one primary component are assigned individual secondary side arbitrators. An arbitrator that corresponds to a specific secondary component accessible by more than one primary component is referred to herein as a secondary side arbitrator. In one embodiment, there is a secondary side arbitrator for each secondary component in a computer system. In other embodiments, there is a secondary side arbitrator for selected secondary components in a system. The techniques of the present invention recognize that Ethernet component support for high-level language programs can be more efficiently and effectively provided in a system by using secondary side arbitration.

Figure 6:
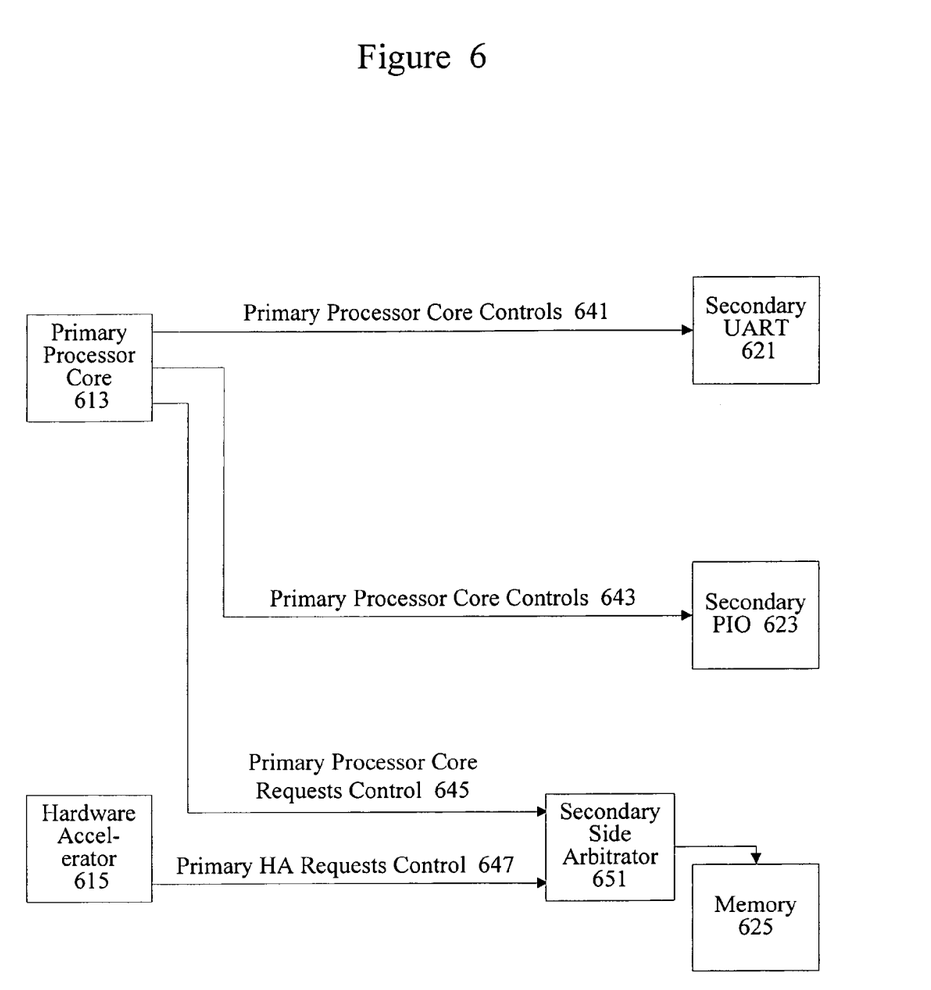
FIG. 6 is a diagrammatic representation showing an interconnection fabric.

FIG. 6 is a diagrammatic representation showing one example of a system using secondary side arbitration, sometimes referred to as slave side arbitration, simultaneous multiple primary components, or simultaneous multiple masters. A system using individual arbitrators that correspond to individual secondary components accessible by more than one primary component is referred to herein as a secondary side arbitration system. The secondary side arbitration system no longer requires a bus or a system bus arbitrator that prevents a second primary component from accessing a second secondary component when a first primary component is accessing a first secondary component. According to various embodiments, a secondary component such as peripheral interface 625 is associated with a secondary side arbitrator 651. However, secondary components UART 621 and PIO 623 are not associated with any arbitrator. In one example, secondary component UART 621 and secondary PIO 623 can only be accessed by primary CPU 613 and not by primary Ethernet device 615. A secondary memory component 625, however, can be accessed by both primary CPU 613 and primary Ethernet device 615.

According to various embodiments, a secondary side arbitrator 651 allows a first secondary component in a system to be accessed by a first primary component at the same time a second secondary component in the system is accessed by a second primary component. For example, peripheral interface 625 can be accessed by primary Ethernet 615 through secondary side arbitrator 651 at the same time, secondary UART 621 is accessed by primary CPU 613.

By allowing a CPU to access a secondary component at the same time another primary component such as a streaming output device or an Ethernet component is accessing memory, bus bottlenecks can be reduced. By using the simultaneous multiple primary component architecture, more direct connections between components can also be supported.

Figure 7:
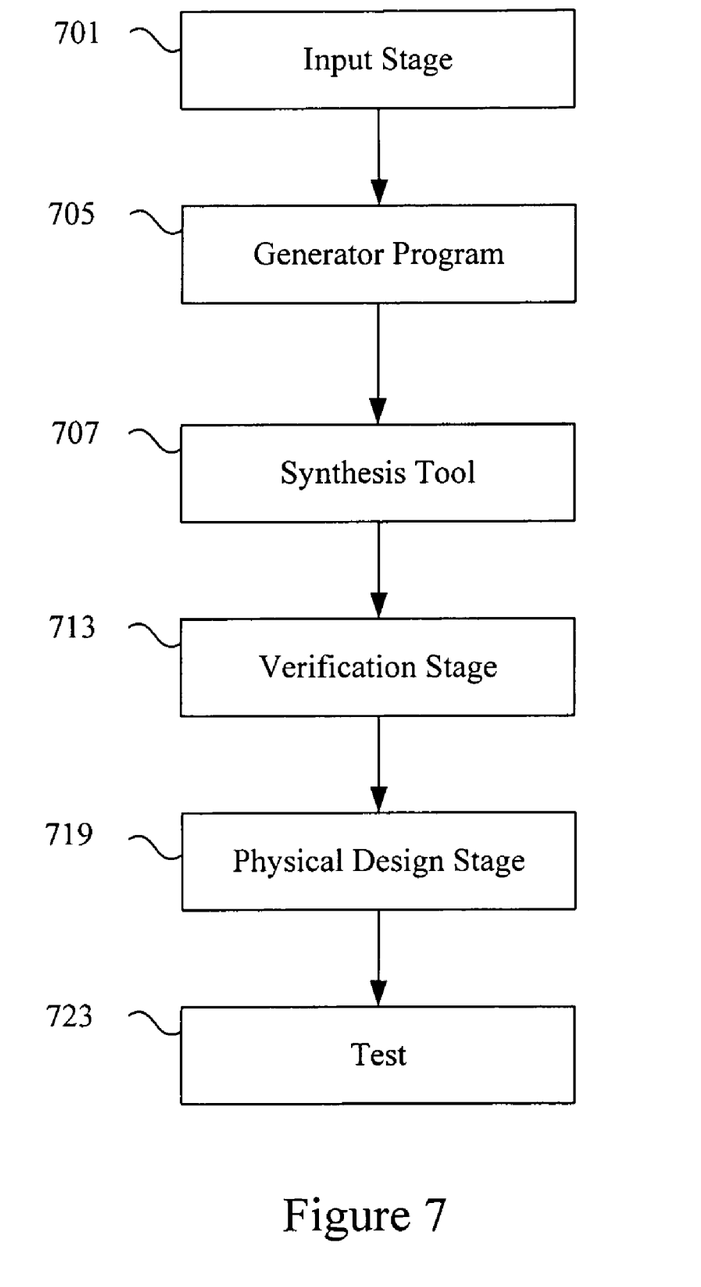
FIG. 7 is a diagrammatic representation showing a technique for implementing the programmable chip.

FIG. 7 is a diagrammatic representation showing implementation of a system on a programmable chip. An input stage 701 receives selection information typically from a user for logic such as a processor core as well as other components such as a streaming output device to be implemented on an electronic device. In one example, the input received is in the form of a high-level language program. A generator program 705 creates a logic description and provides the logic description along with other customized logic to any of a variety of synthesis tools, place and route programs, and logic configuration tools to allow a logic description to be implemented on an electronic device.

In one example, an input stage 701 often allows selection and parameterization of components to be used on an electronic device. The input stage 701 also allows configuration of variable or fixed latency support. In some examples, components provided to an input stage include intellectual property functions, megafunctions, and intellectual property cores. The input stage 701 may be a graphical user interface using wizards for allowing efficient or convenient entry of information. The input stage may also be a text interface or a program reading a data file such as a spreadsheet, database table, or schematic to acquire selection information. The input stage 701 produces an output containing information about the various modules selected.

In typical implementations, the generator program 705 can identify the selections and generate a logic description with information for implementing the various modules. The generator program 705 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 705 identifies pointers and provides ports for each pointer. One tool with generator program capabilities is System on a Programmable Chip (SOPC) Builder available from Altera Corporation of San Jose, Calif. The generator program 705 also provides information to a synthesis tool 707 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool 709.

As will be appreciated by one of skill in the art, the input stage 701, generator program 705, and synthesis tool 707 can be separate programs. The interface between the separate programs can be a database file, a log, or simply messages transmitted between the programs. For example, instead of writing a file to storage, the input stage 701 can send messages directly to the generator program 705 to allow the generator program to create a logic description. Similarly, the generator program can provide information directly to the synthesis tool instead of writing HDL files. Similarly, input stage 701, generator program 705, and synthesis tool 707 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 707.

A synthesis tool 707 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 713 typically follows the synthesis stage 707. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 713, the synthesized netlist file can be provided to physical design tools 719 including place and route and configuration tools. A place and route tool typically locates logic cells on specific logic elements of a target hardware device and connects wires between the inputs and outputs of the various logic elements in accordance with logic required to implement an electronic design. The device can also be physically tested at 723.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 701, the generator program 705, the synthesis tool 707, the verification tools 713, and physical design tools 719 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 8:
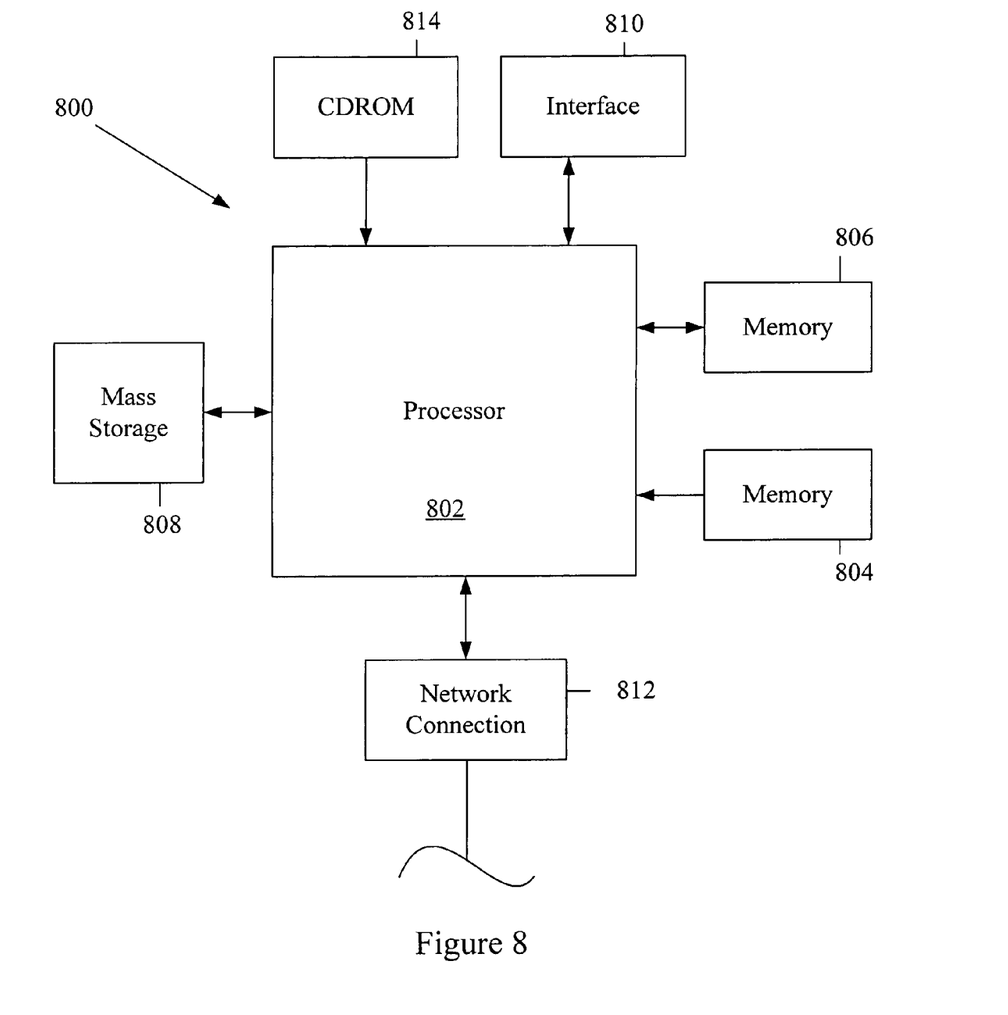
FIG. 8 is a diagrammatic representation depicting a computer system.

FIG. 8 illustrates a typical computer system that can be used to implement a programmable chip. The computer system 800 includes any number of processors 802 (also referred to as central processing units, or CPUs) that are coupled to devices including memory 806 (typically a random access memory, or "RAM"), memory 804 (typically a read only memory, or "ROM"). The processors 802 can be configured to generate a test sequences for any designated processor. As is well known in the art, memory 804 acts to transfer data and instructions uni-directionally to the CPU and memory 806 is used typically to transfer data and instructions in a bi-directional manner.

Both of these memory devices may include any suitable type of the computer-readable media described above. A mass storage device 808 is also coupled bi-directionally to CPU 802 and provides additional data storage capacity and may include any of the computer-readable media described above. The mass storage device 808 may be used to store programs, data and the like and is typically a secondary storage medium such as a hard disk that is slower than memory. The mass storage device 808 can be used to hold a library or database of prepackaged logic or intellectual property functions, as well as information on generating particular configurations. It will be appreciated that the information retained within the mass storage device 808, may, in appropriate cases, be incorporated in standard fashion as part of memory 806 as virtual memory. A specific mass storage device such as a CD-ROM 814 may also pass data uni-directionally to the CPU.

CPU 802 is also coupled to an interface 810 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 802 optionally may be coupled to a computer or telecommunications network using a network connection as shown generally at 812. With such a network connection, it is contemplated that the CPU might receive information from the network, or might output information to the network in the course of performing the above-described method steps. It should be noted that the system 800 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 808 or 814 and executed on CPU 808 in conjunction with primary memory 806.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of primary and secondary components and should not be restricted to the ones mentioned above. It is therefore intended that the invention be interpreted to include all variations and equivalents that fall within the true spirit and scope of the present invention.

What is claimed is:

1. A method for generating an IP core, the method comprising:
    receiving parameter information associated with a parameterizable core, the parameterizable core comprising option information corresponding to the received parameter information;
    decrypting the parameterizable core and decrypting scripts associated with the parameterizable core and;
    processing the parameterizable core using the decrypted scripts to generate a static core, the decrypted scripts removing the option information included in the parameterizable core, wherein the static core is specially configured based on the received parameter information.

2. The method of claim 1, further comprising:
    capturing information associated with the static core.

3. The method of claim 1, wherein the static core is not parameterizable.

4. The computer system of claim 1, wherein scripts are provided in a high level programming language.

5. The computer system of claim 4, wherein parameterizable cores are provided in a hardware descriptor language.

6. The method of claim 1, wherein information associated with the static core is captured in memory mapped IO.

7. The method of claim 6, wherein information associated with the decrypted parameterizable core and the decrypted scripts are not captured.

8. The method of claim 7, wherein information associated with the decrypted parameterizable core and the decrypted scripts are not written to any persistent memory.

9. The method of claim 1, wherein the parameterizable core is decrypted using first key information.

10. The method of claim 1, wherein the scripts associated with the parameterizable core are decrypted using second key information.

11. The method of claim 1, wherein the parameterizable core is a parameterizable component configurable for implementation on a programmable chip.

12. A computer system for generating an IP core, the computer system comprising:
    memory;
    an interface operable to receive parameter information associated with a parameterizable core, the parameterizable core comprising option information corresponding to the received parameter information and;
    a processor coupled to the memory, the processor operable to decrypt the parameterizable core and decrypt scripts associated with the parameterizable core and evaluate the parameterizable core using the decrypted scripts, the decrypted scripts removing option information included in the parameterizable core, wherein a static core is specially configured based on the received parameter information.

13. The computer system of claim 12, wherein the processor is further configured to capture information associated with the static core.

14. The computer system of claim 12, wherein the scripts are provided in a high level programming language.

15. The computer system of claim 14, wherein parameterizable cores are provided in a hardware descriptor language.

16. The computer system of claim 12, wherein the scripts are used to generate the static core.

17. The computer system of claim 16, wherein the static core is no longer parameterizable.

18. The computer system of claim 12, wherein information associated with the static core is captured in memory mapped IO.

19. The computer system of claim 18, wherein information associated with the decrypted parameterizable core and the decrypted scripts are not captured.

20. The computer system of claim 19, wherein information associated with the decrypted parameterizable core and the decrypted scripts are not written to any persistent memory.

21. The computer system of claim 12, wherein the parameterizable core is decrypted using first key information.

22. The computer system of claim 12, wherein the scripts associated with the parameterizable core are decrypted using second key information.

23. The computer system of claim 12, wherein the parameterizable core is a parameterizable component configurable for implementation on a programmable chip.

24. A programmable chip, comprising:
a plurality of components, wherein at least one of the plurality of components is implemented on the programmable chip is a static core converted from a parameterizable core, wherein the static core is generated by using scripts to remove option information associated with the parameterizable core and wherein the static core is specially configured based on user provided parameter information.

25. The programmable chip of claim 24, further comprising:
a simultaneous multiple prima component fabric.

26. An apparatus for generating an IP core, the apparatus comprising:
means for receiving parameter information associated with a parameterizable core, the parameterizable core comprising option information corresponding to the received parameter information;
means for decrypting the parameterizable core and decrypting scripts associated with the parameterizable core and;
means for processing the parameterizable core using the decrypted scripts to generate a static core, the decrypted scripts removing option information included in the parameterizable core, wherein the static core is specially configured based on the received parameter information.

27. The apparatus of claim 26, further comprising:
means for capturing information associated with the static core.

* * * * *